(12) United States Patent
Erdmann et al.

(10) Patent No.: US 11,098,622 B2
(45) Date of Patent: Aug. 24, 2021

(54) OIL SEPARATOR

(71) Applicant: REINZ-DICHTUNGS-GMBH, Neu-Ulm (DE)

(72) Inventors: Christoph Erdmann, Ulm (DE); Francesco Zitarosa, Illertissen (DE)

(73) Assignee: 3NINE AB, Nacka Strand (SE)

( * ) Notice: Subject to any disclaimer, the term of this patent is extended or adjusted under 35 U.S.C. 154(b) by 435 days.

(21) Appl. No.: 16/074,228

(22) PCT Filed: Jan. 31, 2017

(86) PCT No.: PCT/EP2017/052060
§ 371 (c)(1),
(2) Date: Jul. 31, 2018

(87) PCT Pub. No.: WO2017/134055
PCT Pub. Date: Aug. 10, 2017

(65) Prior Publication Data
US 2020/0386130 A1 Dec. 10, 2020

(30) Foreign Application Priority Data

Feb. 1, 2016 (DE) ...................... 20 2016 100 479.9

(51) Int. Cl.
*B01D 47/00* (2006.01)
*F01M 13/04* (2006.01)
(Continued)

(52) U.S. Cl.
CPC ............. *F01M 13/04* (2013.01); *B01D 45/14* (2013.01); *B04B 5/005* (2013.01); *B04B 5/12* (2013.01);
(Continued)

(58) Field of Classification Search
CPC ........... F01M 13/04; F01M 2013/0427; F01M 2013/0422; B04B 5/12; B04B 5/005;
(Continued)

(56) References Cited

U.S. PATENT DOCUMENTS 2,897,917 A * 8/1959 Hunter .................. B60T 17/004
55/404
3,851,819 A * 12/1974 Tadokoro .................. F16H 3/66
494/8
(Continued)

FOREIGN PATENT DOCUMENTS

DE         19933040 A1    1/2001
DE      202004004215 U1   7/2005
(Continued)

OTHER PUBLICATIONS

European Patent Office, International Search Report with written Opinion issued in Application PCT/EP2017/052060/, dated Aug. 5, 2017, 13 pages, European Patent Office, Rijswijk, Netherlands.
(Continued)

*Primary Examiner* — Dung H Bui
(74) *Attorney, Agent, or Firm* — Mark P. Stone (57) ABSTRACT

An oil separator with a housing, in which is rotatably mounted a rotor containing a drive element, an oil separating element and a shaft for driving the oil separating element of the rotor via the shaft of the rotor around the shaft axis. At least one element of the rotor is seated in such a way that it is displaceable via an actuator element axially from a first inoperative positive to a second operating position.

14 Claims, 6 Drawing Sheets

(51) Int. Cl.
*B04B 5/00* (2006.01)
*B04B 5/12* (2006.01)
*B04B 9/06* (2006.01)
*B04B 9/10* (2006.01)
*B01D 45/14* (2006.01)

(52) U.S. Cl.
CPC .................. *B04B 9/06* (2013.01); *B04B 9/10* (2013.01); *B04B 2005/125* (2013.01); *F01M 2013/0422* (2013.01); *F01M 2013/0427* (2013.01)

(58) Field of Classification Search
CPC ....... B04B 9/06; B04B 9/10; B04B 2005/125; B01D 45/14; B01D 45/12
See application file for complete search history.

(56) References Cited

U.S. PATENT DOCUMENTS

| | | | | |
|---|---|---|---|---|
| 3,857,783 | A * | 12/1974 | Nishimura | B04B 9/06 210/138 |
| 5,239,972 | A * | 8/1993 | Takeyama | F01M 13/0416 123/41.86 |
| 6,424,067 | B1 * | 7/2002 | Samways | F16C 32/0427 310/90.5 |
| 7,291,192 | B1 * | 11/2007 | Lavasser | A47L 5/22 55/406 |
| 7,992,551 | B2 | 8/2011 | Shieh | |
| 2002/0107132 | A1 * | 8/2002 | Fischer | B04B 9/08 494/49 |
| 2002/0128140 | A1 * | 9/2002 | Frehland | B04B 5/005 494/49 |
| 2007/0163444 | A1 * | 7/2007 | Eliasson | B04B 5/12 96/281 |
| 2010/0180854 | A1 * | 7/2010 | Baumann | B04B 5/005 123/196 A |
| 2013/0005559 | A1 * | 1/2013 | Burford | B04B 5/005 494/41 |
| 2018/0030868 | A1 * | 2/2018 | Elsaesser | F04D 29/706 |
| 2018/0141057 | A1 * | 5/2018 | Hagqvist | B04B 9/02 |

FOREIGN PATENT DOCUMENTS

| | | |
|---|---|---|
| DE | 10350562 B4 | 7/2008 |
| DE | 202007009913 U1 | 11/2008 |
| DE | 202007010792 U1 | 12/2008 |
| DE | 102012213877 A1 | 2/2014 |
| DE | 102013226610 A1 | 6/2015 |
| EP | 1464797 B1 | 5/2007 |
| EP | 1372863 B1 | 5/2010 |
| GB | 2322315 A | 8/1998 |
| WO | 03061838 A1 | 7/2003 |
| WO | 2015128925 A1 | 3/2015 |

OTHER PUBLICATIONS

German Patent Office, German Search Report with written Opinion issue in Application 202016100479.9, dated Dec. 28, 2016, 5 pages.

* cited by examiner

OIL SEPARATOR

The present invention relates to an oil separator for separating oil mist or oil droplets from gases, especially from crankcase gases.

BACKGROUND OF THE INVENTION

Such oil separators are for example designed as centrifugal separators with a disk separator, in which a gas inside a chamber of a stationary casing is made to rotate by means of a rotor. The oil droplets and the oil mist are accelerated in the outward direction on account of the occurrent centrifugal force and in the process are deposited on impingement walls. In order to make the gas execute a rotational movement use is made of an oil separating element which for example can be constructed as a stack of similarly designed truncated cone-shaped disks. The gas which is to be cleaned is now directed centrally or from the periphery into the interspaces between the individual disks of the stack and as a result of the rotational movement of the stack and of the disks are entrained at up to 15000 rpm there. In the process, a deposition of the oil droplets and the oil mist on the disks and on the casing wall is carried out.

Such oil separators are used especially for separating oil mist and oil droplets from blow-by gases of internal combustion engines. The oil separating element is usually made to rotate by a drive element which in its turn is driven by means of the oil pressure of the internal combustion engine. The engine oil at the same time ensures lubrication of the oil separating element and of the drive element and therefore ensures a low-friction and low-noise operation of the oil separator.

If the internal combustion engine is shut down, then the drive element and the oil separating element continue to operate for some time on account of the high rotational speed. Depending on the bearings of the separating element, the coasting can be several seconds or minutes.

Since during this after-running, however, the oil pressure by means of the oil pump is no longer applied to the oil separator, the movable parts of the oil separator are lubricated to only an inadequate degree. This can lead not only to damage of the movable parts of the oil separator but also lead to a considerable noise development during the after-running.

SUMMARY OF THE INVENTION

It is therefore the object of the present invention to provide an oil separator according to the type of design above which has high operational reliability, low failure risks and excellent endurance characteristics. At the same time, the oil separator according to the invention is to be low in noise during the after-running.

This object is achieved by means of the oil separator according to claim 1. Advantageous developments of the oil separator according to the invention are presented in the dependent claims.

The starting point for the present invention is to curtail the after-running of the oil separator after shutdown of the internal combustion engine, via the oil pressure of which the oil separator is driven, and therefore to reduce wear of the oil separator and also its noise development during the after-running.

To this end, provision is made for an oil separator which has a housing in which a rotor is rotatably mounted. The rotor has a drive element, a shaft and also an oil separating element, wherein the oil separating element and the drive element are intercoupled via the shaft and rotatably mounted around the shaft axis.

According to the invention, at least one element of the rotor, i.e. the drive element, the oil separating element and/or the shaft, is now mounted in such a way that by means of an actuator element it is displaceable axially in relation to the shaft axis from a first inoperative position to a second operating position.

In the case of the oil separator according to the invention, the rotor or one of its elements can therefore be displaced from an inoperative position into an operating position during startup of the oil separator. In the operating position, the rotor, as in the case of other oil separators described in the prior art, has a low-noise, low-wear, well lubricated operation. In contrast to this, in the inoperative position for example a frictional engagement can lead to a deceleration of the rotor or of one of its elements and as a result of this the rotor can be braked in an accelerated but smooth manner. As a result of this, a quicker stopping of the rotor is brought about so that the duration of the after-running with low lubrication, high wear and high noise development is curtailed.

The drive element, the oil separating element and the shaft can advantageously be displaced together in the rotor, especially rigidly coupled. In the following text, the description therefore applies to the individual drive element or to the entire rotor in each case, possibly even just to one of the other elements alone or in combination with the other elements of the rotor.

The actuator element can for example be a pressure face which during startup of the rotor is subjected to pressure action, for example by the oil pressure of the internal combustion engine, and as a result of this displaces the rotor or one of its elements. The displacement is advantageously carried out in the axial direction of the shaft. The actuator element, for the example the pressure face which is subjected to hydraulic pressure action, can consequently be arranged on any part of the rotor. A one-piece design with an element of the rotor is also possible.

The drive element of the oil separator is especially advantageously designed as a hydraulically driven rotor which, as is already known from the prior art, can be subjected to oil pressure action of the engine oil of the internal combustion engine.

In combination with an actuator element which is subjected to oil pressure action this always leads to the actuator element displacing the rotor from the inoperative position to the operating position when the rotor starts up and subsequently, when the internal combustion engine is shut down and the rotor is no longer driven, at the same time leads to the rotor being transferred from the operating position to the inoperative position.

As a result of this, without further assistance during the operation of the rotor, this is therefore brought into a low-wear operating state and without further assistance this is braked smoothly during run-down of the rotor. As a result of this, the duration of the poorly lubricated, wear-prone after-running is curtailed.

According to the invention, it is adequate for example if the rotor or one of its elements is displaced from the inoperative position only slightly into an operating position, for example by approximately 0.1 mm in the axial direction of the shaft, in order to enable a low-wear operation of the rotor. This means that the necessary clearance of the shaft in it bearings is already adequate in order to realize the two positions (inoperative position and operating position). The return of the rotor from the operating position to the inoperative position can be carried out after the drop in oil pressure solely via gravity force, by means of a return spring or by means of gravity force in conjunction with a return spring.

In order to effect a smooth braking of the rotor and its elements, provision can furthermore be made for a braking element which in the inoperative position creates a frictional engagement with the rotor and in the operating position is released from the rotor. The braking element can for example be a surface of a sliding bush of the shaft or a braking surface which is arranged on the housing of the oil separator and which in the inoperative state enters into frictional engagement with one of the elements of the rotor, for example with the drive element. As a result of a lifting of the rotor, the frictional engagement is released in the process or after shutdown of the internal combustion engine the rotor is displaced/lowered again so that it enters into frictional engagement with the braking element and is therefore braked.

In order to achieve good lubrication and low wear, the braking element can advantageously be arranged in the flow of the hydraulic fluid which drives the drive element of the rotor, that is to say for example in the flow of the engine oil of the internal combustion engine.

For the design of the rotor, a large number of advantageous embodiments are provided. Therefore, for example the drive element and/or the shaft can be produced integrally with the lowermost disk of the disk stack in each case or also with the uppermost disk of the disk stack. It is also possible to shrink both the drive element and the disk stack of the separating element onto the shaft, or to injection mold these therewith.

All the parts of the rotor can be designed with each other or be designed with material uniformity, especially consisting of plastic or metal. Hybrid solutions consisting of plastic and metal are also possible.

The solution according to the invention can be used both for a parallel flow conducting of gas to be cleaned and oil to be separated and for their conducting in counterflow.

In the following text, some examples of oil separators according to the invention are provided, wherein the same or similar elements are provided with the same or similar designations. Their description is therefore possibly not repeated. Furthermore, the following exemplary embodiments contain a large number of advantageous developments and features which, however, as such are also suitable separately for further development of the present invention without being considered in combination with the further advantageous features of the respective embodiment. Combinations of individual features of different exemplary embodiments are also easily possible as advantageous developments.

DETAILED DESCRIPTION OF THE INVENTION

Figure 1A:
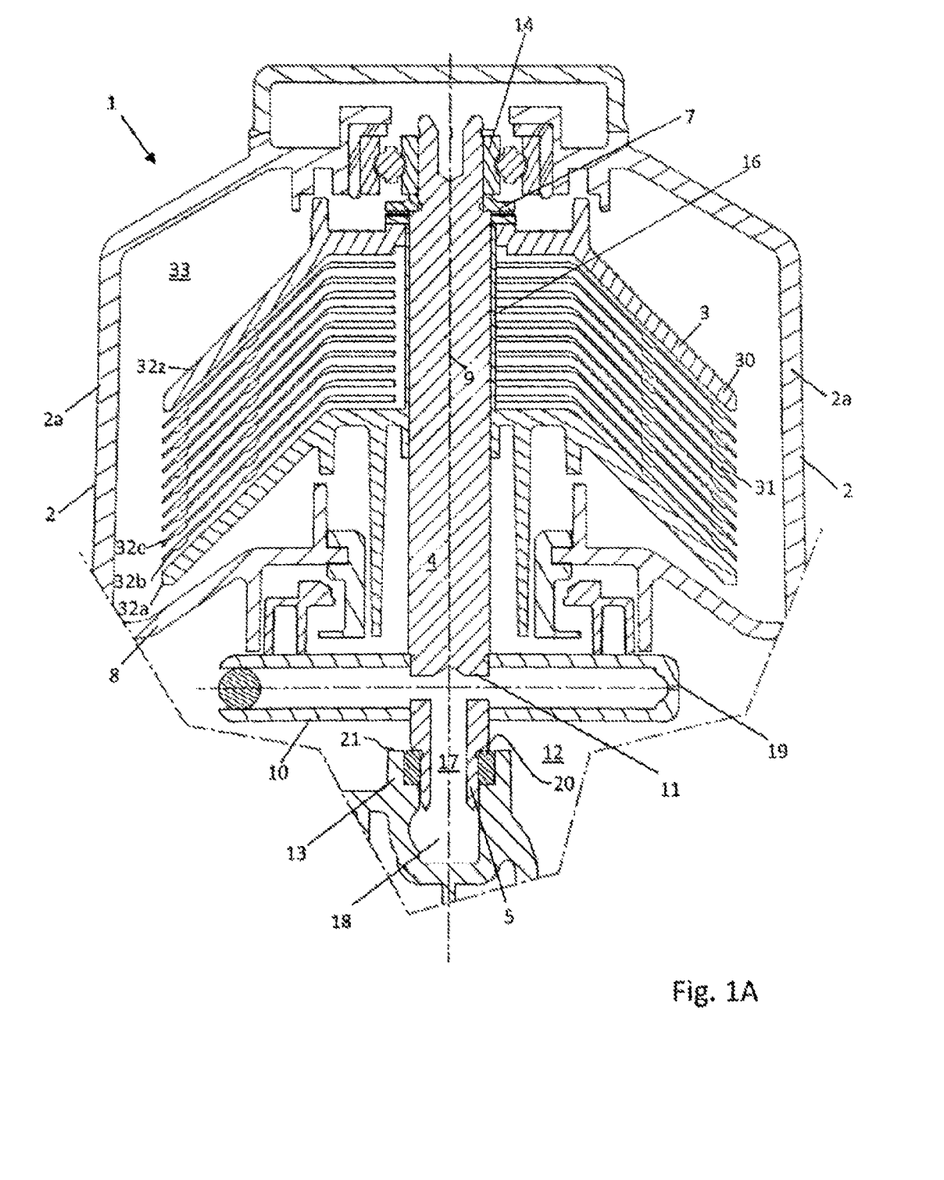
FIG. 1 shows an oil separator according to the invention in different cross sections in different operating states.

FIG. 1 shows an oil separator 1 according to the invention. FIG. 1 shows an oil separator 1 with a housing 2 and a rotor 3. The housing 2 has two halves, between which a partition 8 divides the interior space of the housing 2 into a first compartment 12 and a second compartment 33. Only the housing half 2a is visible in FIG. 1A. The first compartment 12 contains a turbine 10 as the drive element. The second compartment 33 contains a disk stack 31 as the oil separating element 30. The disk stack 31 has truncated cone-shaped disks which are stacked one inside the other at a small distance from each other, of which only two inner disks, designated 32b, 32c, are identified here. The disk stack furthermore has a lowermost disk 32a and an uppermost disk 32z. These differ from the rest of the disks of the disk stack not only as a result of their greater thickness but also by the fact that they serve for oil separation only on one of their surfaces in each case.

In the entire lower compartment 12, which serves as a drive chamber, provision is made for oil which also lubricates the drive element 10.

The drive element 10 is connected to the disk stack 31 via a shaft 4 so that via the drive element 10 the disk stack 31 can be made to execute a rotational movement around the center axis 9 of the shaft 4. In this case, the disk stack 31, the shaft 4 and the drive element 10 form parts of the rotor 3.

The shaft is rotatably mounted in a lower bearing 13, with a bearing bush 5, and in an upper bearing 14.

For operating the oil separator, the drive element 10 is now driven. This can be carried out via the oil pressure of the engine oil of an internal combustion engine, wherein in this case the pressurized oil, via an opening 18 reaching into the figure plane, enters a cavity 17 in the interior space of the shaft 4 and flows through the nozzle 19 against a wall, not shown here, so that its recoil effects the driving of the rotor 3. The drive element 10 and the shaft 4 and also the disk stack 31 of the oil separating element 30 are intercoupled so that the drive element 10 makes the rotor 3 and therefore the oil separating element 30 to execute a rotational movement around the center axis 9 of the shaft 4. If now a gas is directed into the interspaces between the individual disks 32a, 32b, 32c . . . , 32z, then the gas experiences a high centrifugal force. This leads to a deposition of oil mist and oil droplets on the disks 32a, . . . 32z. The deposited oil is then centrifuged outward in the direction of the wall 2a and the thereby cleaned gas is discharged from the oil separator 30. This is not shown in more detail here.

FIG. 1A of the drawing (as well as FIG. 5B of the drawing) illustrates that the shaft 4 has a plastic liner 16 which with the disk of the disk stack of the oil separating element which is arranged nearest to the drive element or the disk which is arranged furthest away from the drive element is designed with material uniformity and/or in one piece.

Figure 1B:
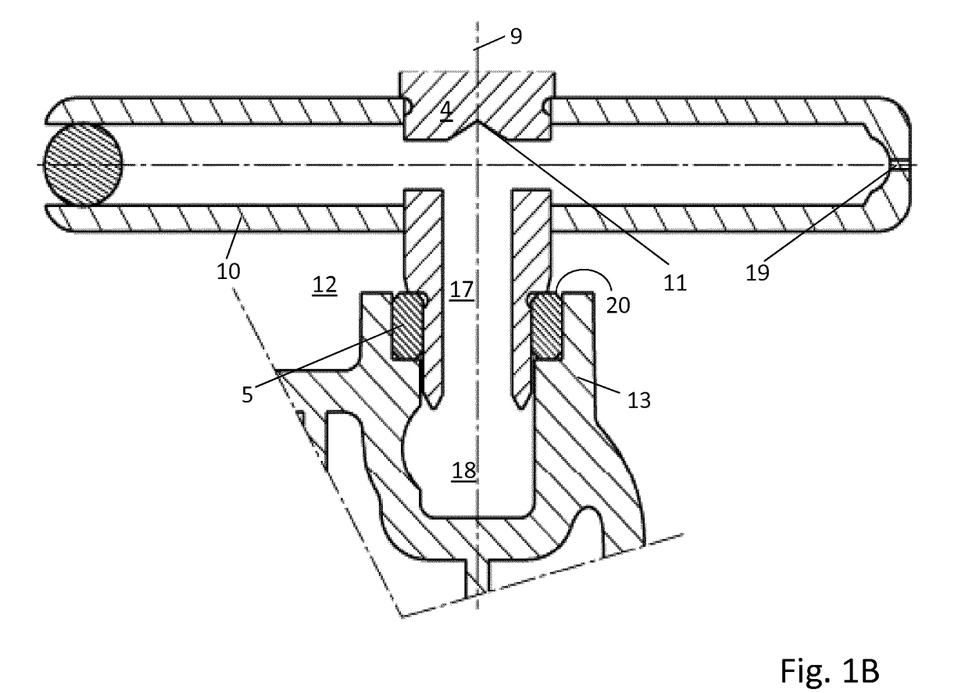
Figure 1C:
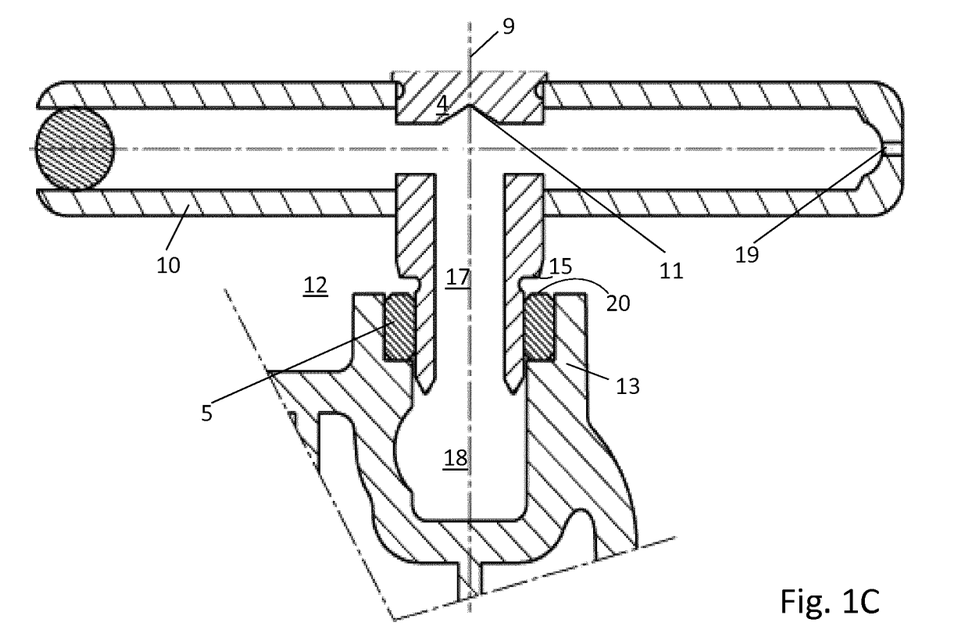

FIGS. 1B and 1C show the oil separator in detail in two positions, namely in the inoperative position (FIG. 1B) and in the operating position (FIG. 1C). In the inoperative position, the shaft 4 in its lower bearing 13 rests by means of a lower flange 15 (see FIG. 1C) on braking elements 20 which prevent rotation of the shaft. If pressurized oil enters the cavity 17 in the shaft 4 through the opening 18 which lies behind the plane of the drawing, the pressure face 11 is subjected to action of this pressurized oil and the shaft 4 is slightly displaced axially, for example by 0.1 mm, in the direction of the disk stack 31 so that a lower flange 15 of the shaft is lifted from the braking element 20 and therefore the shaft 4 can rotate freely without frictional engagement with the braking element 20. This operating position is shown in FIG. 1C.

Between the operating position and the inoperative position, the shaft 4 with its flange 15 therefore moves back and forth on the surface of the bearing bush 5 in the direction of the braking element 20 and in the direction of a position remote therefrom. The drive element 10 with its pressure face 11 in the cavity 17 of the shaft 4 therefore also serves at the same time as an actuator element 11. The return position from the operating position can be carried out exclusively by oil pressure no longer being applied and by the rotor 3 lowering by gravity force action, but it can optionally also be brought about or assisted by means of a spring 7 which in FIG. 1A is arranged beneath the upper bearing 14 and is pretensioned in the direction of the shaft axis 9.

Figure 2A:
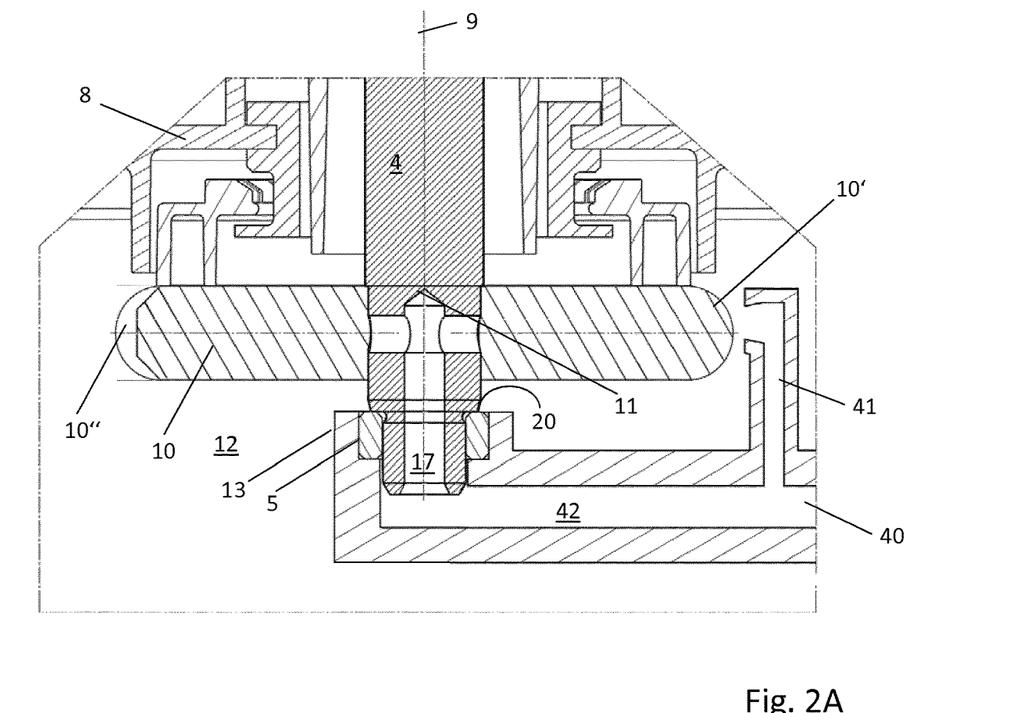
FIG. 2 shows sections through a further oil separator according to the invention.
Figure 2B:
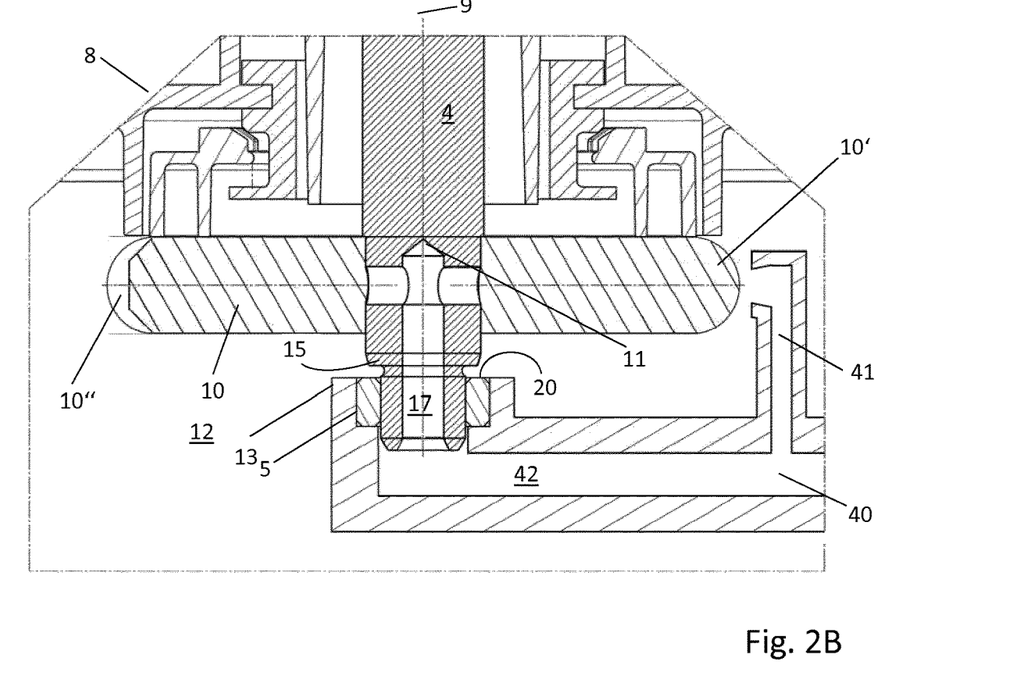

FIGS. 2A and 2B show details in the inoperative position and operating position of a further oil separator according to the invention. FIGS. 2A and 2B show similar details as in FIGS. 1B and 1C.

Unlike the embodiment of FIG. 1, in the embodiment of FIG. 2 an oil feed passage 40 is visible in the lower compartment 12 of the oil separator. This passage branches into two passage sections 41 and 42. The passage section 41 serves for feeding engine oil to the drive element 10, as is already known in the prior art. In this case, a tangential inflow of the engine oil onto a vane wheel 10' of the drive element 10 takes place and consequently makes this vane wheel execute a rotational movement. On the left hand side of the view, a further vane wheel 10" of the drive element 10 can be seen. The second passage section 42 leads from the bottom to the lower end of the shaft 4, in the interior space 17 of which a pressure face 11 is formed again. If the pressure face 11 is now subjected to action of the pressure of the engine oil of an internal combustion engine via the passage 42, then the shaft 4 is displaced in the axial direction and transfers into the operating state of FIG. 2B. In this state, the flange 15 of the shaft 4 is decoupled from the braking element 20 so that from now on the entire rotor 3, therefore also the shaft 4 and the oil separating element 30, can operate freely with low friction.

If the internal combustion engine stops, then the pressure face 11 is longer exposed to the operating pressure of the engine oil so that the shaft 4 drops down again and by means of its flange 15 enters into frictional engagement with the braking element 20. As a result of this, the shaft is braked quickly and smoothly so that the oil separator is also stopped quickly and with low noise and also low wear.

Figure 3A:
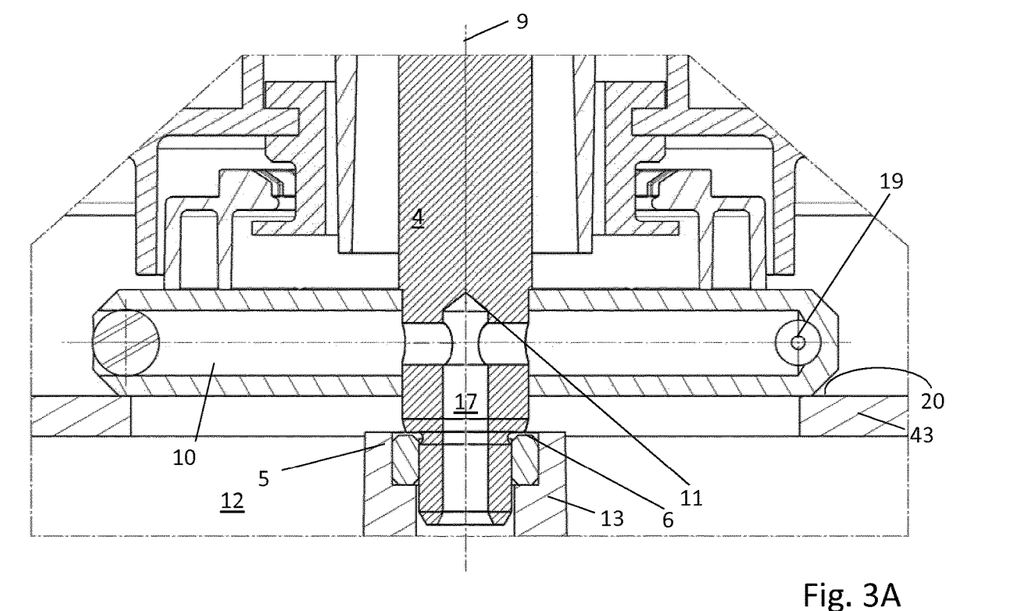
FIG. 3 shows sections through a further oil separator according to the invention.
Figure 3B:
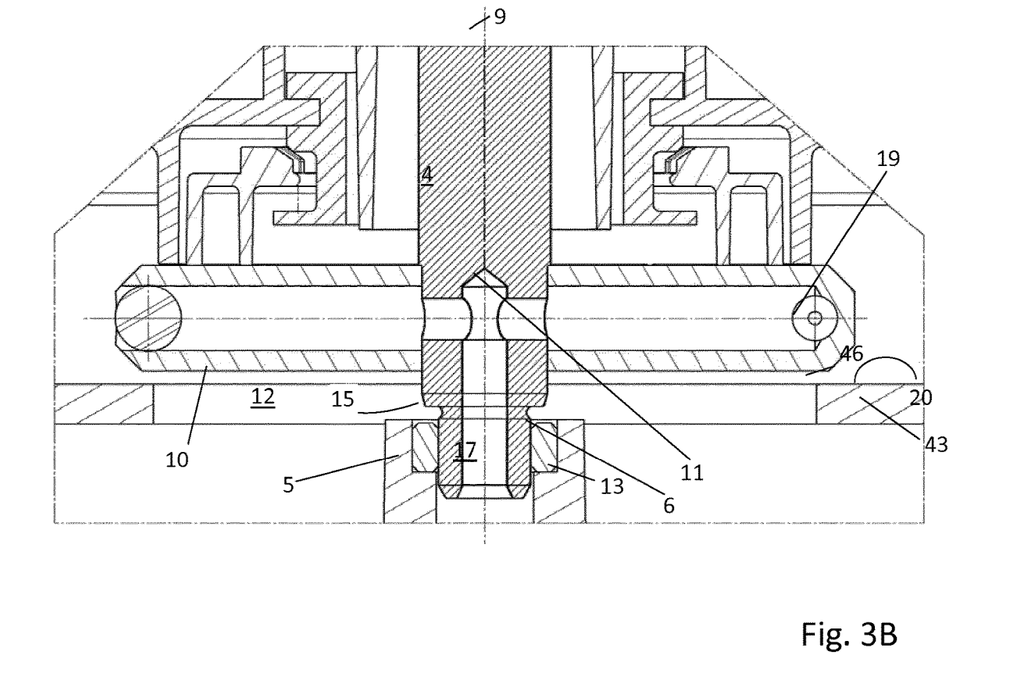

FIG. 3 shows in sub-FIGS. 3A and 3B a further embodiment of the oil separator according to the invention. In this oil separator, a further wall 43 is now provided in the first compartment 12. Oil feed is carried out as in the exemplary embodiment of FIG. 1 via the feed of pressurized oil to the interior space 17 of the shaft 4 and action upon the pressure face 11, wherein in FIG. 3, however, the oil feed passage is not visible. Providing the pressure face 11 is exposed to oil pressure action as an actuator element, the rotor 3 is displaced upward, the gap 46 is opened and the rotor 3 can rotate with low friction. If the surface 11 is no longer exposed to oil pressure action, the rotor 3 drops down, the gap 46 closes and the outer edge of the lower surface of the drive element 10 comes into contact and frictional engagement with the upper surface 22 of the wall 43. This surface 22 now acts as a braking element 20 and the rotation of the rotor 3 quickly comes to a halt.

Whereas in the exemplary embodiment shown in FIG. 3 the surface 6 of the bearing bush 5 is set back in the downward direction, so that it cannot act as a braking surface, embodiments in which both the surface of the bearing bush 5 and that of the wall 43 serve as a braking surface are also possible.

Figure 4A:
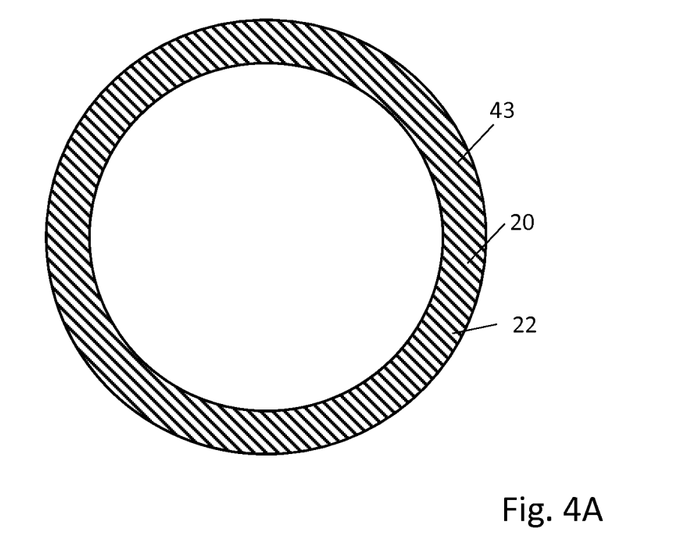
FIGS. 4A and 4B show two embodiments of braking elements in oil separators according to the invention.

For braking elements 20, formed by the wall 43, mounted on the housing side and extending circumferentially along the housing, a number of embodiments are possible, as is further explained with reference to FIG. 4. In FIG. 4A, only the wall 43 as a braking element 20 with a braking surface 22 is shown. This extends circumferentially along the housing 2b.

Figure 4B:
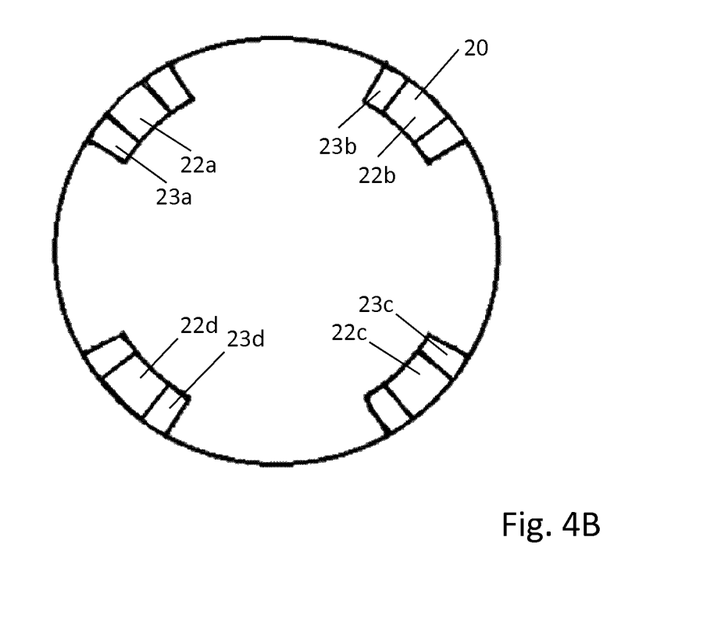

In FIG. 4B, the braking element shown in FIG. 4A is no longer of a completely circumferentially extending construction but is rather designed as four braking surfaces 22a, 22b, 22c, 22d in sections. Each of these braking surfaces 22a to 22d, on its leading edge, mounted opposite the rotation direction in relation to the rotation direction of the rotor, has a bevel 23a, 23b, 23c and 23d which serves as a lead-in element for the drive element when the drive element 10 is lowered onto the braking surfaces 22a to 22d for braking.

Figure 5A:
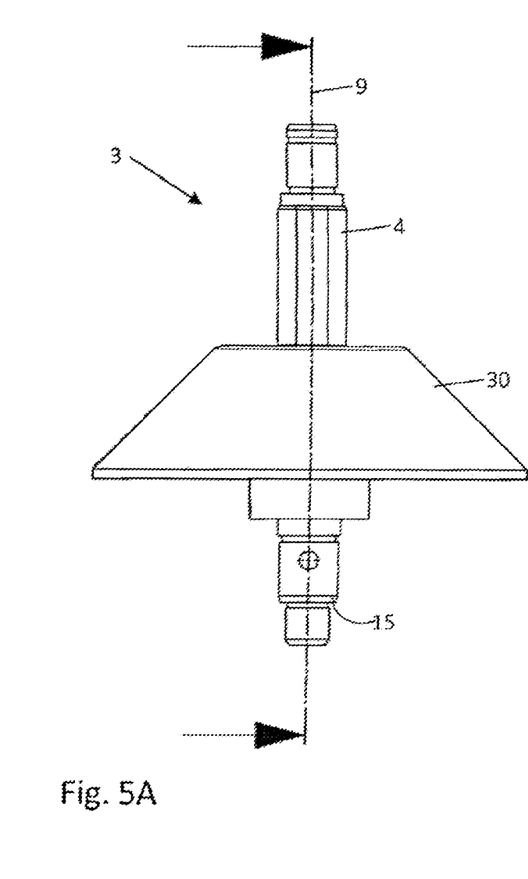
FIG. 5 shows a front view and a sectional view of a rotor of an oil separator according the invention.
Figure 5B:
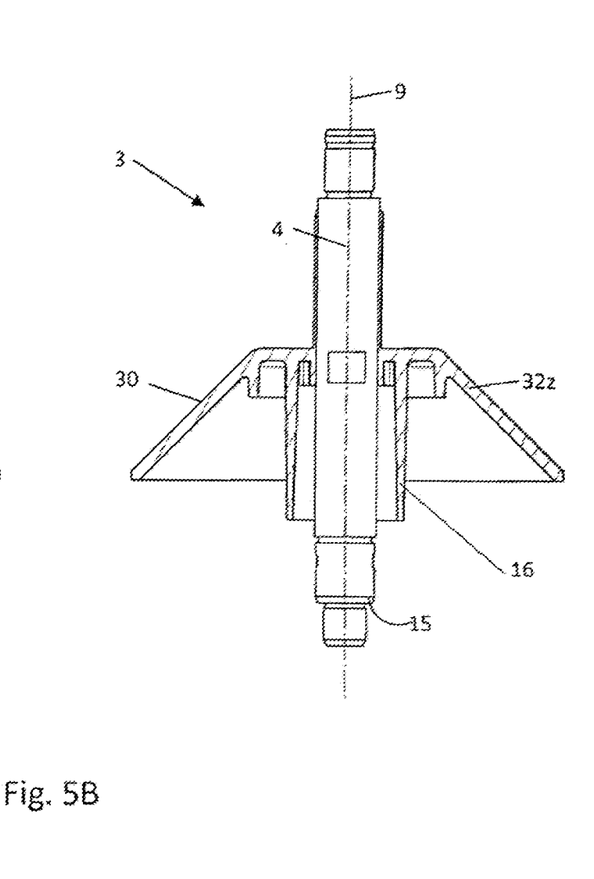

FIG. 5 shows a detail from the rotor 3, namely a shaft 4 and a separating element 30 in top view (FIG. 5A) and in cross section (FIG. 5B). In this exemplary embodiment, the uppermost disk 32z is injected onto the shaft 4 and leads to a force engagement between the shaft 4 and the separating element 30. In FIG. 5B, the further disk-like elements 32, 32b, . . . are not shown.

With the oil separator according to the invention, provision is consequently made for an oil separator which compared with similar oil separators from the prior art have very low wear and therefore offer great operational reliability and long-term stability. Furthermore, the oil separator has only a brief after-running, e.g. until reaching the inoperative state and therefore the level of noise is very low.

The invention claimed is:

1. An oil separator comprising a housing and a rotor having a drive element rotatably mounted within the housing, and an oil separating element and a shaft for driving the oil separating element of the rotor via the shaft of the rotor around the shaft axis wherein at least one of said elements of the rotor is configured to be displaceable via an actuator element axially from an inoperative position to an operating position when the separator is started up and from an operating position to an inoperative position when the separator is stopped, said actuator element comprising a flange defined on the shaft of the rotor, said actuator element further comprising a surface of a slide bush of the shaft forming a braking element having a braking surface, wherein in the inoperative position the braking surface of the braking element axially frictionally engages said flange, and wherein in the operating position the braking surface of the braking element is disengaged from said flange, and wherein the oil separating element has a stack of truncated cone-shaped disks which are arranged one above the other, extend coaxially to the shaft axis and are rotatably mounted in the middle by means of the shaft.

2. The oil separator as claimed in claim 1, wherein the drive element, the oil separating element and the shaft are displaceable together in a rigidly coupled manner.

3. The oil separator as claimed in claim 1, wherein the actuator element is a pressure face exposed to hydraulic pressure action, which pressure face is part of the rotor or is rigidly or flexibly coupled or connected to the rotor.

4. The oil separator as claimed in claim 1, wherein the braking element is arranged in the flow of hydraulic fluid.

5. The oil separator as claimed in claim 1, wherein the drive element and/or the shaft and/or a sliding bearing are comprised of aluminium, stainless steel and/or plastic.

6. The oil separator as claimed in claim 1, wherein the shaft and a disk of the stack of truncated cone-shaped disks of the oil separating element which is arranged nearest to the drive element or one said disk which is arranged furthest away from the drive element are designed with material uniformity and/or in one piece.

7. The oil separator as claimed in claim 1, wherein the shaft has a plastic liner which with the disk of the disk stack of the oil separating element which is arranged nearest to the drive element or the disk which is arranged furthest away from the drive element is designed with material uniformity and/or in one piece.

8. The oil separator as claimed in claim 1, wherein the braking element with the disk which is arranged nearest to the drive element or the disk which is arranged furthest away from the drive element can enter into frictional engagement.

9. The oil separator as claimed in claim 1, wherein the actuator element is arranged on or in the rotor and/or is designed as part of the rotor, including as part of the shaft.

10. The oil separator as claimed in claim 9, wherein a partial flow of hydraulic fluid acts in the axial direction upon the actuator element which is formed in or on the shaft, and a second partial flow of the hydraulic fluid acts upon the drive element in the radial direction.

11. The oil separator as claimed in claim 1, wherein the drive element is a hydraulically driven drive element.

12. The oil separator as claimed in claim 11, wherein at least one rotatably seated element of the rotor is configured to be displaced via hydraulic pressure, including an operating pressure of hydraulic fluid, from the inoperative position to the operating position.

13. The oil separator as claimed in claim 12, wherein the hydraulic fluid is conducted into the rotor in an interior space of the shaft in its axial direction and acts upon the actuator element.

14. The oil separator as claimed in claim 12, wherein the hydraulic fluid is oil, including engine oil.

* * * * *